United States Patent
Cook et al.

(10) Patent No.: US 9,545,052 B2
(45) Date of Patent: Jan. 17, 2017

(54) CAM DRIVEN LOW PROFILE SICKLE DRIVE

(75) Inventors: Joel T. Cook, Lititz, PA (US); Gary L. Bich, New Holland, PA (US); David M. DeChristopher, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 468 days.

(21) Appl. No.: 14/128,119

(22) PCT Filed: May 25, 2012

(86) PCT No.: PCT/US2012/039702
§ 371 (c)(1),
(2), (4) Date: Dec. 20, 2013

(87) PCT Pub. No.: WO2012/166652
PCT Pub. Date: Dec. 6, 2012

(65) Prior Publication Data
US 2014/0130472 A1     May 15, 2014

Related U.S. Application Data

(60) Provisional application No. 61/491,028, filed on May 27, 2011.

(51) Int. Cl.
*A01D 34/30*    (2006.01)
*A01D 34/04*    (2006.01)
*A01D 34/14*    (2006.01)

(52) U.S. Cl.
CPC ............. *A01D 34/04* (2013.01); *A01D 34/145* (2013.01); *A01D 34/30* (2013.01)

(58) Field of Classification Search
CPC ...... A01D 34/13; A01D 34/02; A01D 34/037; A01D 34/30; A01D 34/145; F16H 21/00; F16H 21/44
(Continued)

(56) References Cited

U.S. PATENT DOCUMENTS

| 283,425 A | 8/1883 | Scofield |
| 1,230,710 A | 6/1917 | Hill |

(Continued)

FOREIGN PATENT DOCUMENTS

| CH | 685969 A5 * 11/1995 ............. A01D 34/08 |
| GB | 832750 A     4/1960 |

(Continued)

*Primary Examiner* — John G Weiss
(74) *Attorney, Agent, or Firm* — Peter K. Zacharias; Patrick M. Sheldrake

(57) ABSTRACT

The drive has an input rotatable about an upstanding rotational axis and carries a cam followed by a pivot arm pivotable about an upstanding pivotal axis. A power source is connected in rotatably driving relation to the input. The pivot arm connects to a knife assembly of a sickle. The input, cam and pivot arm are generally flat, and the power source is vertically coextensive therewith for incorporation in or below the floor of a header of a plant cutting machine. Rotation of the input causes offset movement of the cam about the rotational axis, resulting in sideward pivoting of the pivot arm and sickle knife. A second cam drive can oppositely drive a second sickle knife, such that opposite forces generated by operation of the drives will be largely canceled.

21 Claims, 11 Drawing Sheets

(58) Field of Classification Search
USPC .......... 56/158, 296, 12.6, 17.6, 297; 74/595, 74/22 A, 25, 55
See application file for complete search history.

(56) References Cited

U.S. PATENT DOCUMENTS

| | | |
|---|---|---|
| 1,701,227 A | 2/1929 | Dawson |
| 1,880,121 A | 9/1932 | Chadbourne |
| 2,486,209 A | 10/1949 | Roads |
| 2,641,894 A | 6/1953 | McShane |
| 2,724,941 A | 11/1955 | Zwiesler |
| 3,017,736 A | 1/1962 | Hill |
| 3,121,303 A | 2/1964 | Tomlinson et al. |
| 3,973,378 A | 8/1976 | Bartasevich et al. |
| 4,866,921 A | 9/1989 | Nagashima et al. |
| 4,909,025 A | 3/1990 | Reissig et al. |
| 6,698,177 B1 | 3/2004 | Akehi et al. |
| 7,401,458 B2 | 7/2008 | Priepke |
| 7,520,118 B1 | 4/2009 | Priepke |
| 7,730,709 B2 | 6/2010 | Priepke |
| 7,805,919 B2 | 10/2010 | Priepke |
| 7,810,304 B2 | 10/2010 | Priepke |
| 8,011,272 B1 | 9/2011 | Bich et al. |
| 2009/0272091 A1 | 11/2009 | Sharaf |
| 2011/0099964 A1* | 5/2011 | Coers ............... A01D 34/30 56/296 |

FOREIGN PATENT DOCUMENTS

| | | | | |
|---|---|---|---|---|
| IT | DE 19524039 A1 * | 1/1997 | ............ | A01D 34/30 |
| JP | H0244926 U | 3/1990 | | |

* cited by examiner

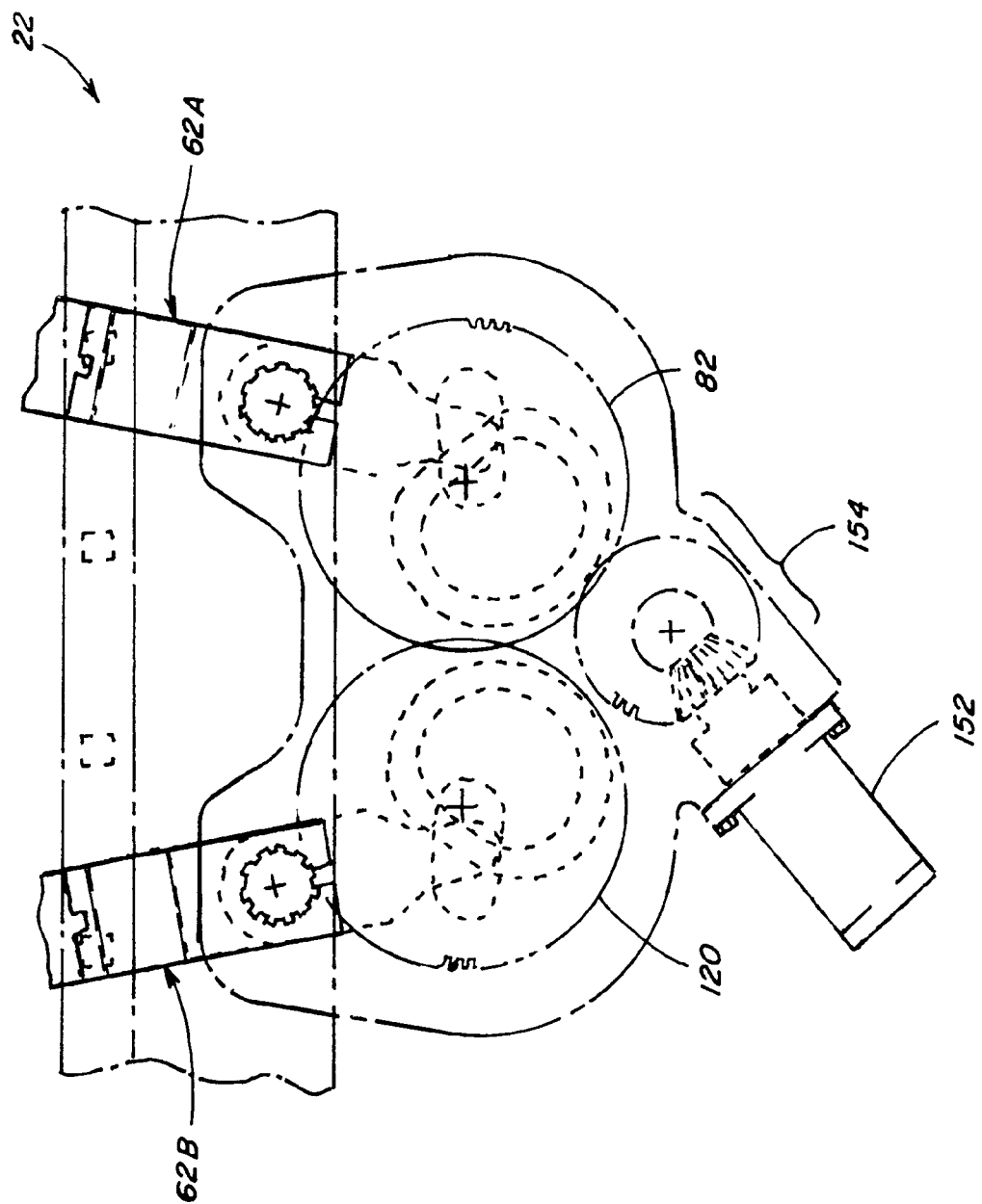

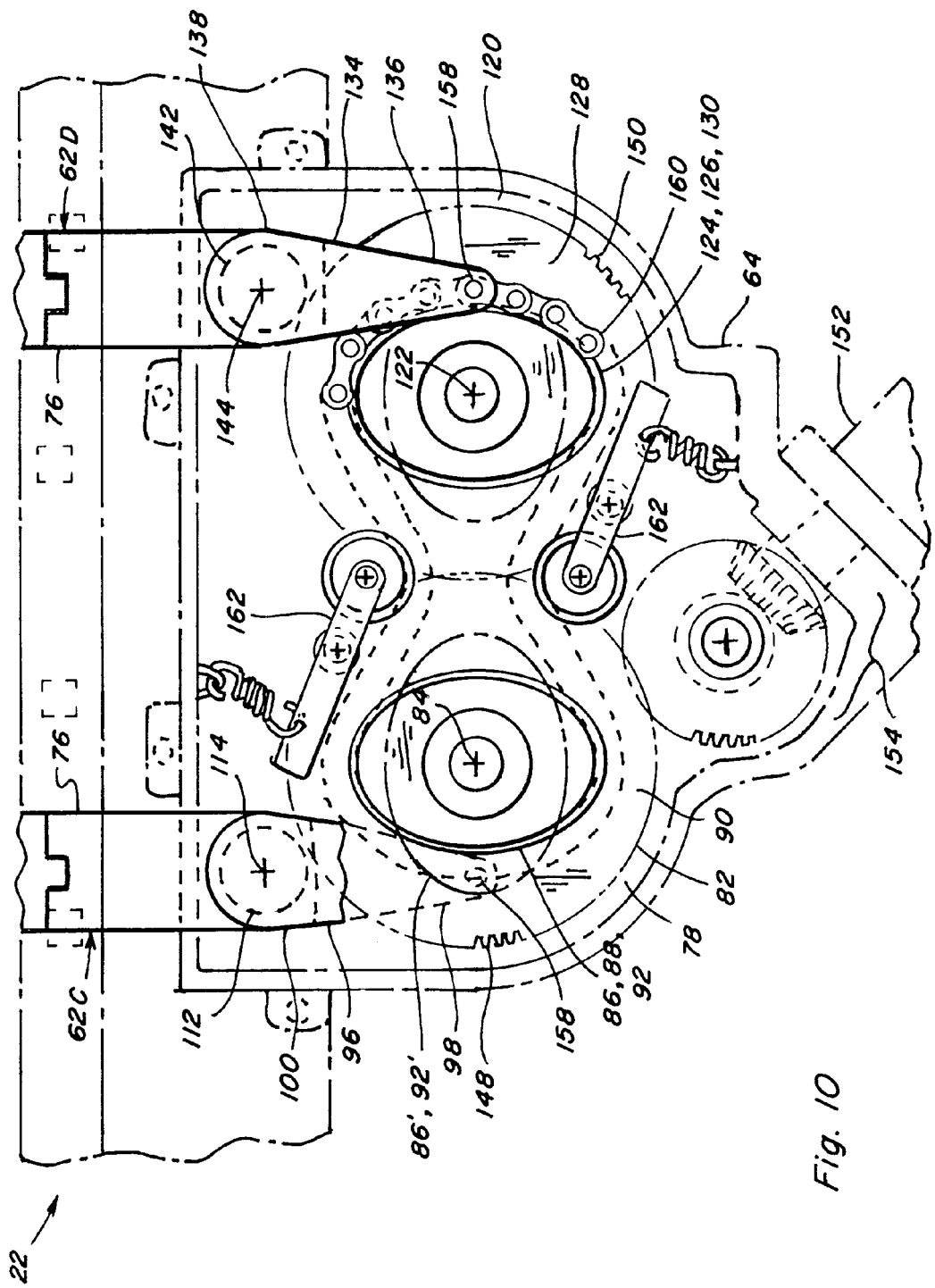

CAM DRIVEN LOW PROFILE SICKLE DRIVE

This application is the US National Stage for International Application No. PCT/US12/39702, filed on May 31, 2012, which itself is related to and claims the benefit of U.S. Provisional Application No. 61/491,028, filed May 27, 2011.

TECHNICAL FIELD

This invention relates generally to a drive for the sickle of a header of an agricultural cutting machine, such as a combine, windrower or other crop harvesting machine, or a mower, and more particularly, to a low profile drive mechanism having only a cam driven pivoting shaft extending upwardly from an upper enclosure thereof for connection to a knife head, and which, including the power source, is configured to have an overall profile shape when viewed from the side that tapers convergingly toward a forward end thereof, so as to be adapted to be disposed in or below a floor or pan of the header, to reduce interference with plant material flow.

BACKGROUND ART

The disclosure of U.S. Provisional Application No. 61/491,028, filed May 27, 2011, is hereby incorporated herein in its entirety by reference.

Sickles typically including cutter bars supporting a row of knives, have been used to cut plants, including, but not limited to, hay, grasses, small grains and the like, for many years. The knives are composed of a plurality of knife or sickle sections which are mounted in side by side relation forming an elongate metal knife assembly. The elongate knife assembly is normally supported so as to slide longitudinally along an elongate stationary bar that has forwardly projecting, spaced apart guards bolted to a structural beam. The knife assembly moves back and forth in a reciprocating movement to move the knives relative to the guards so that the leading knife edges of the knives cross over the guards or through slots in the guards. This produces a shearing or cutting action which severs plant stems and stalks or other material captured between the knives and the guards.

In a harvesting machine, such as a combine or windrower, the knife assembly and stationary bar are typically supported in connection with a cutting head or header, and are oriented so as to extend sidewardly along a forward edge portion of structure such as a floor or pan of the header, hereinafter sometimes referred to generally as the floor. The floor or pan defines the lower periphery of a cut crop or plant flow area, which can include conveying apparatus, such as one or more augers or belts, operable in cooperation with a reel in machines so equipped, for conveying the cut plant material and crops, for instance, to a feeder inlet of a combine or windrow forming apparatus of a windrower.

The knife assembly is driven reciprocatingly longitudinally by an oscillating drive, which can include, but is not limited to, an eccentric shaft on a rotating hub, a wobble drive, or a similar well known commercially available device. Such drives are typically located at the sides of the header, so as to drive the knife assembly from the end. This location is advantageous as it allows the driving point for the knife assembly to be in line with the stationary bar, provides clearances for removal of the knife assembly, and provides space for assembly of the drive. Disadvantages of the side location include that the header must include significant frame structure for supporting the drive and to withstand forces and vibrations generated thereby. The end structure or crop divider at the end of the header must also be relatively wide, to accommodate the drive and to direct adjacent standing crops therepast, and increasing the possibility of accidentally pushing down adjacent standing crops. Additionally, for headers utilizing two drives located on opposite sides of the header, it is usually desired to time the operation of the drives such that the forces and vibrations generated by the respective drives cancel one another. This typically involves relatively long mechanical drive lines connecting the two drives together, which is disadvantageous as it adds weight, cost and complexity.

A knife assembly, which will weigh from 35 to 38 pounds for a typical 20 foot wide header, typically must accelerate and decelerate two times per cycle as a result of the reciprocating movement. A typical speed for the knife assembly is up to about 16 hertz or cycles per second. Thus, it can be seen, the reciprocating motion at a high cycle per second generates high acceleration values and high deceleration values that in turn generate high forces on the structural components. These high forces can have at least two negative effects, vibration at the drive system that may be transmitted to other components of the machine, and fatigue failure of the structural components themselves. On larger headers, for instance, headers 30 feet wide and greater, two knife assemblies each equal to one-half the sideward extent of the header are often used.

Driving a knife assembly or assemblies of a header from a more central location, such as the center of the header, would provide several advantages compared to a side location. Notably among these advantages, the header structure would not be required to support heavy drive units on one or both sides, such that the structure of the header could be lighter. Long timing apparatus extending between the ends could also be eliminated. If the drive mechanism could be incorporated into a location that would not interrupt or require dividing crop or plant material flow through the crop flow area of the header, the normal crop flow of the header would not be significantly impacted. And, since the drives are not located in the ends, the end dividers can be made significantly thinner, such that the header can have a shorter overall width, would be more easily maneuverable in relation to adjacent standing crop, and danger of downing the adjacent standing crop would be reduced.

Reference Priepke U.S. Pat. Nos. 7,810,304; 7,805,919; 7,730,709; 7,520,118; and 7,401,458, which demonstrate that a sickle drive or drives can be incorporated in or below the header floor to solve one or more of the problems set forth above in regard to end mounted drives and interruption of plant material flow in the crop flow area of the header.

What is sought is a sickle drive adapted to be incorporated into or below the floor of a header of a plant cutting or harvester to reduce interruption and splitting of plant material flow, and which overcomes one or more of the shortcomings and limitations set forth above.

SUMMARY OF THE INVENTION

What is disclosed is a sickle drive adapted to be incorporated into or below the floor of a header of a plant cutting or harvester to reduce interruption and splitting of plant material flow, and which overcomes one or more of the shortcomings and limitations set forth above.

According to a preferred aspect of the invention, the drive includes a generally flat enclosure having a forward end and bounding and defining a cavity rearwardly of the forward end. The drive includes a rotatable first input element supported in the cavity for rotation about a generally upstanding first rotational axis, and a first cam element supported in the cavity in connection with the first input element for rotation thereby. The first cam element includes a radial facing cam surface extending about the first rotational axis which varies in radial distance therefrom. A first pivot arm has a first end and an opposite upwardly extending second end configured for connection to a knife assembly of a sickle located forwardly thereof. A first pivot shaft supports the first pivot arm for sideward pivotal movement about an upstanding first pivotal axis, and the first end of the first pivot arm includes a cam follower configured and positioned in following relation to the first cam element such that rotation of the first cam element about the first rotational axis will move the first end radially relative to the first rotational axis to reciprocatingly pivot the first pivot arm sidewardly. A power source substantially vertically coextensive with the drive is connected in rotatably driving relation to the first input element.

According to another preferred aspect of the invention, the flat profile of the drive adapts it to be unobtrusively positioned below or in the front region of the floor of a header, to allow relatively unhindered plant material flow thereover.

According to still another preferred aspect of the invention, the drive includes rotatable second input element supported in the cavity beside the first input element for rotation about a generally upstanding second rotational axis, and a second cam element supported in the cavity in connection with the second input element for rotation thereby. The second cam element includes a radial facing cam surface extending about the second rotational axis which varies in radial distance therefrom. A second pivot arm has a first end and an opposite upwardly extending second end configured for connection to a second knife assembly of the sickle. A second pivot shaft supports the second pivot arm for sideward pivotal movement about an upstanding second pivotal axis, and the first end of the second pivot arm includes a cam follower configured and positioned in following relation to the second cam element such that rotation of the second cam element about the second rotational axis will move the first end of the second pivot arm radially relative to the second rotational axis to reciprocatingly pivot the second pivot arm sidewardly.

The power source is preferably connected in rotatably driving relation to the second input element in a manner to cause the sideward pivotal movement of the second pivot arm to be opposite the sideward pivotal movement of the first pivot arm. This is advantageous as opposite forces generated by the operation of the drive will at least largely cancel each other. As a further preferred aspect of the invention, the power source can comprise, for instance, a fluid or electric motor, drive shaft, belt drive, chain drive, or the like.

The enclosure can fully contain the drive or drives, for instance, by including full upper and lower covers, or it can partially enclose the drive or drives, such that all or a portion of any of the elements are exposed. For instance, as a non-limiting example, the enclosure can include or be incorporated in or below the floor of a header of a plant cutting machine which will serve as a cover, with all or a portion of a bottom region of the drive or drives, or elements thereof, exposed to the ground below, essentially the frame of the header then generally defining the lower bounds of the cavity. If two drives are used, separate enclosures can be used to contain all or part of the respective drives. As another option, the pivot arms and knife arms of the knife assemblies can be combined in a unitary member.

BRIEF DESCRIPTION OF THE DRAWINGS

FIG. 5A is a top view of the drives, showing a power source in connection therewith;

FIG. 10 is a simplified schematic top view of the header and another embodiment of cam driven low profile sickle drives.

DETAILED DESCRIPTION OF THE INVENTION

Figure 1:
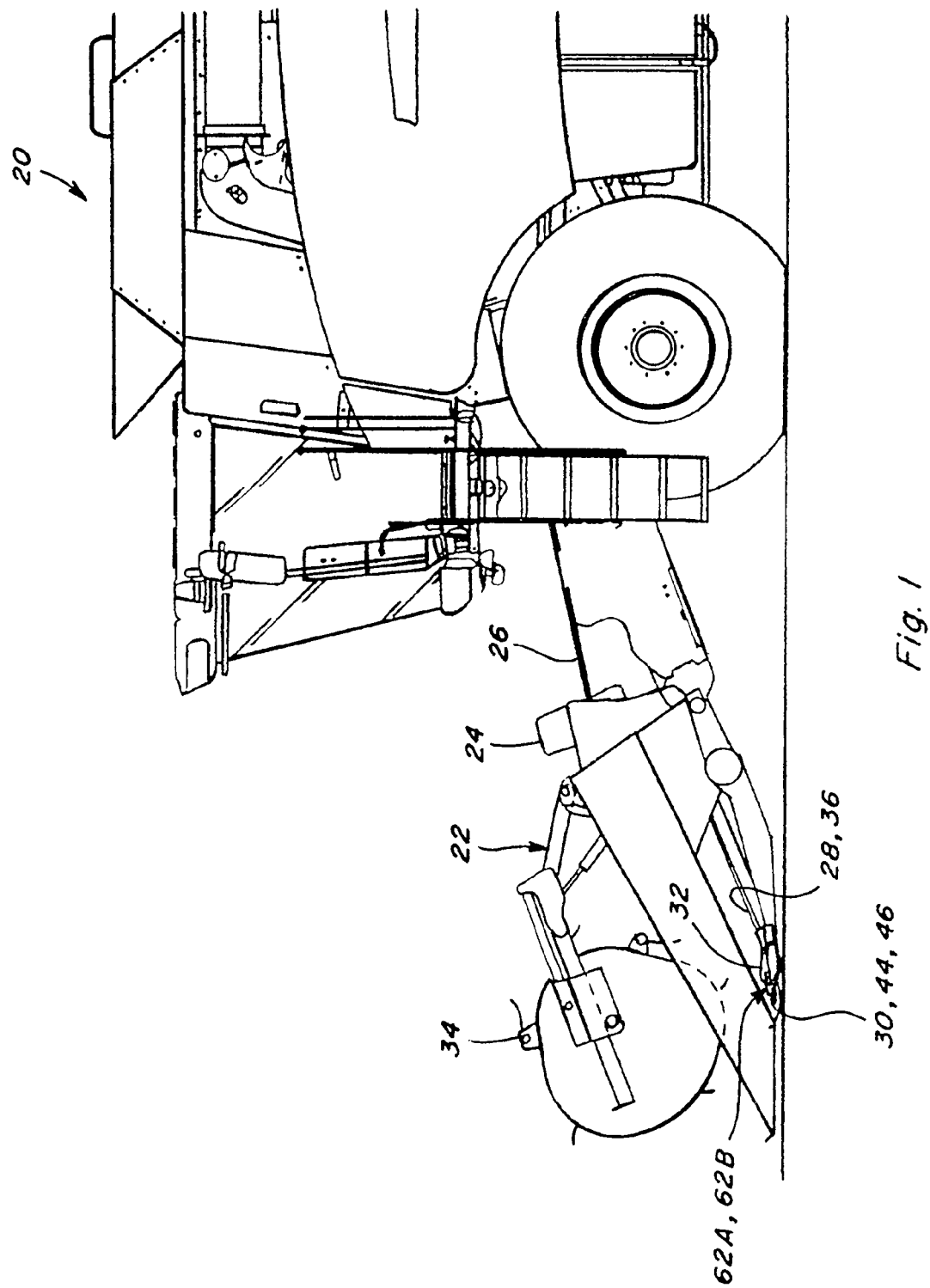
FIG. 1 is a fragmentary side view of a harvester including a header having cam driven low profile sickle drives according to the invention.
Figure 2:
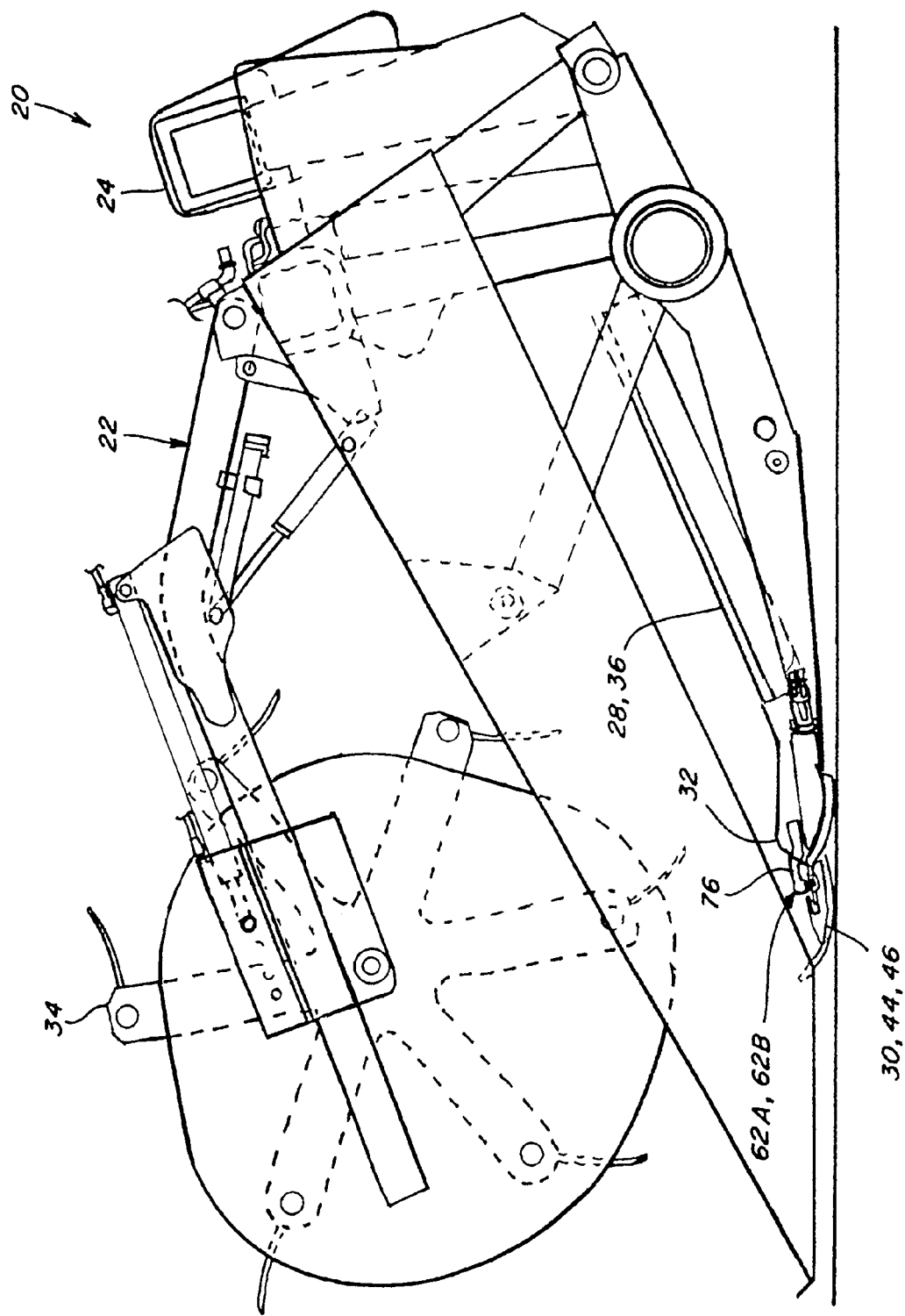
FIG. 2 is an enlarged fragmentary side view of the header and sickle drives of the invention.

Turning now to the drawings wherein a preferred embodiment of the invention is shown, in FIGS. 1 through 5, a conventional, well known agricultural cutting machine, which is a combine 20, is shown including a header 22 incorporating cam driven low profile sickle drives 62A and 62B of the invention as will be explained. Header 22 is shown supported in the conventional, well-known manner on a forward end 24 of combine 20, and is operable for cutting or severing crops such as, but not limited to, small grains such as wheat and soybeans, and inducting the severed crops into a feeder 26 for conveyance into combine 20 for threshing and cleaning, in the well known manner, as combine 20 moves forwardly over a field.

Header 22 includes a pan or floor 28 which is supported in desired proximity to the surface of the field during the harvesting operation, and an elongate, sidewardly extending sickle 30 along a forward edge portion 32 of floor 28, sickle 30 being operable for severing the plants or crop for induction into header 22, as will be explained. Header 22 additionally includes an elongate, sidewardly extending reel 34 disposed above sickle 30 and rotatable in a direction for facilitating induction of the severed plant material or crops into header 22. Here, header 22 is configured as a draper type, having a system of elongate, flat, sidewardly moving draper belts 36 and 38 having upwardly facing surfaces disposed just rearwardly of forward edge portion 32, operable in cooperation with reel 34 for conveying the severed plant material or crops toward an inlet opening of feeder 26 for induction into combine 20, in the well-known manner.

Figure 3:
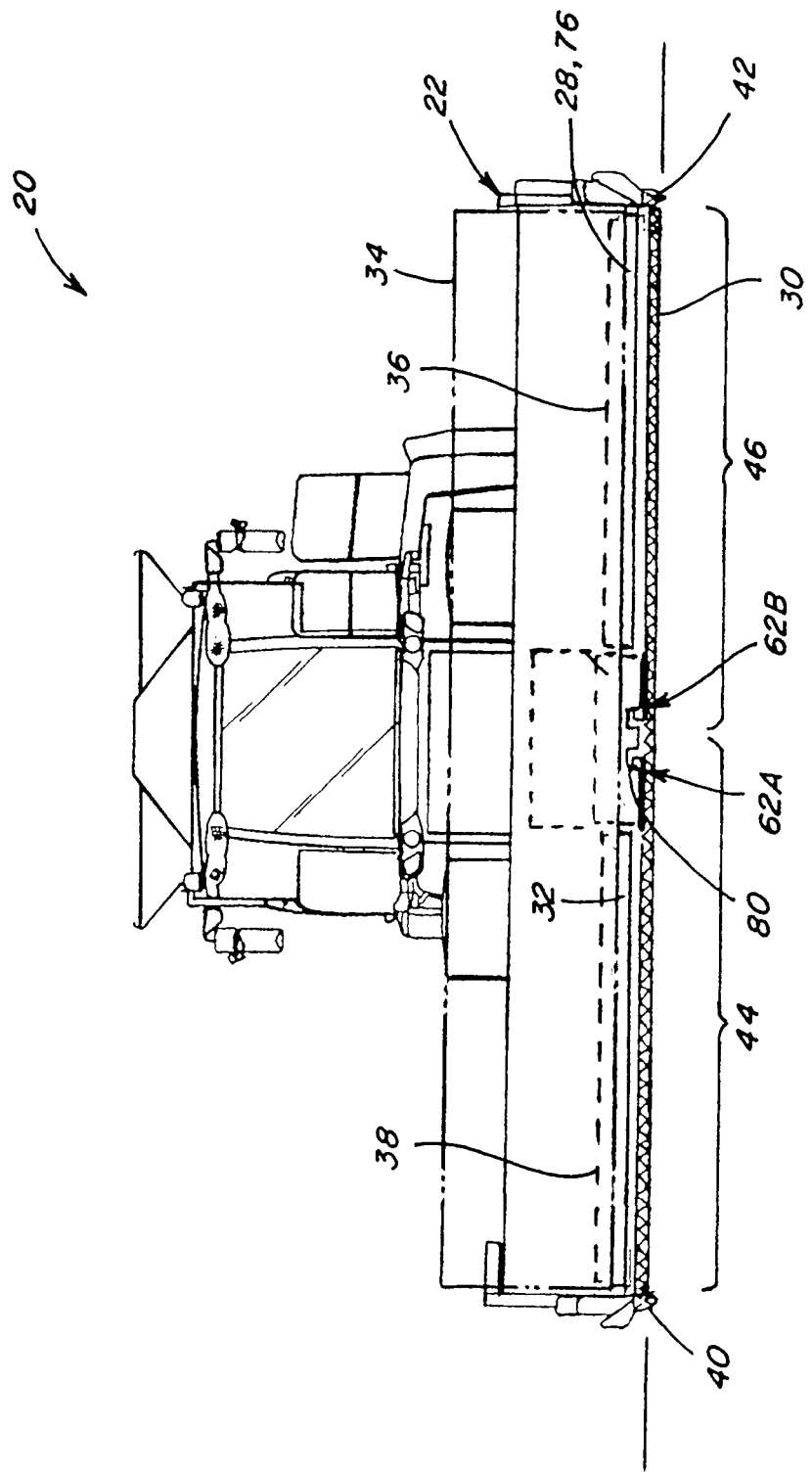
FIG. 3 is a front view of the harvester and header, showing the location of the sickle drives.

Referring more particularly to FIG. 3, sickle 30 extends in a sideward direction along the width of floor 28, between a first side edge portion 40 of the floor, and an opposite second side edge portion 42. Sickle 30 includes an elongate, sidewardly extending first cutter bar assembly 44, and an elongate, sidewardly extending second cutter bar assembly 46 extending in end to end relation to cutter bar assembly 44, cutter bar assemblies 44 and 46 being supported in substantially longitudinally aligned relation adjacent to forward edge portion 32 of floor 28.

Figure 4:
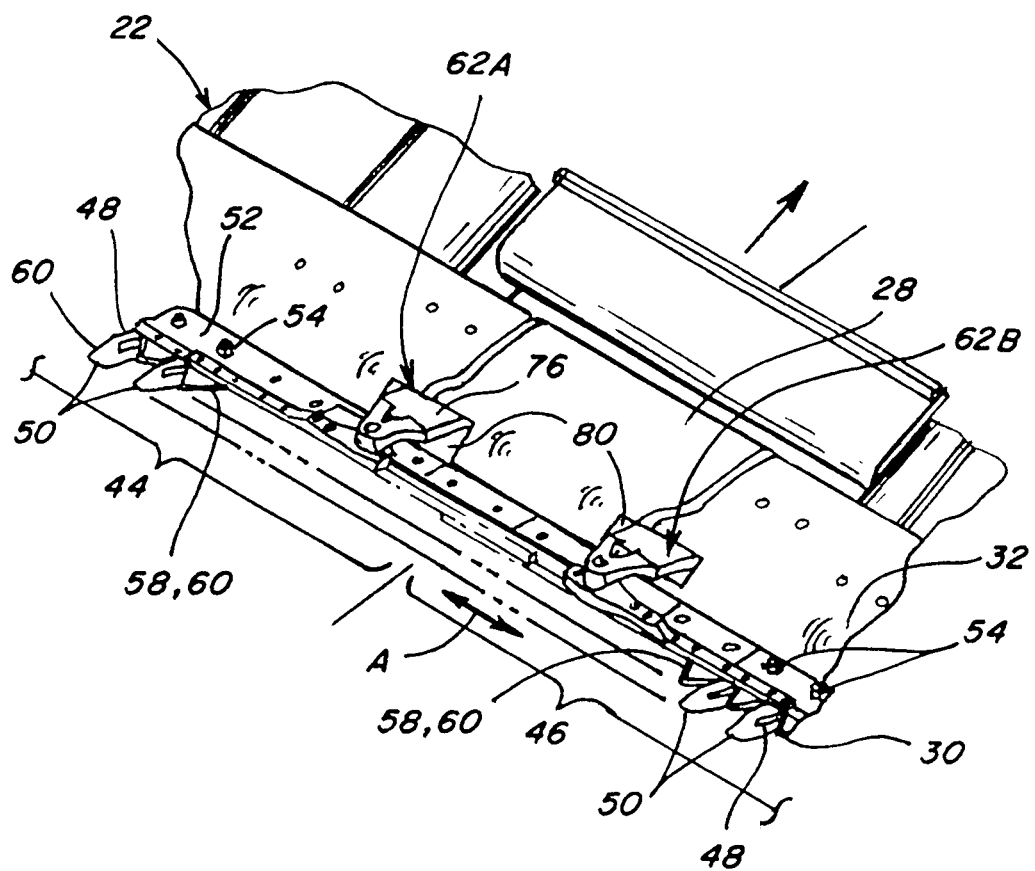
FIG. 4 is a fragmentary perspective view of the header, showing aspects of the sickle drives.
Figure 5:
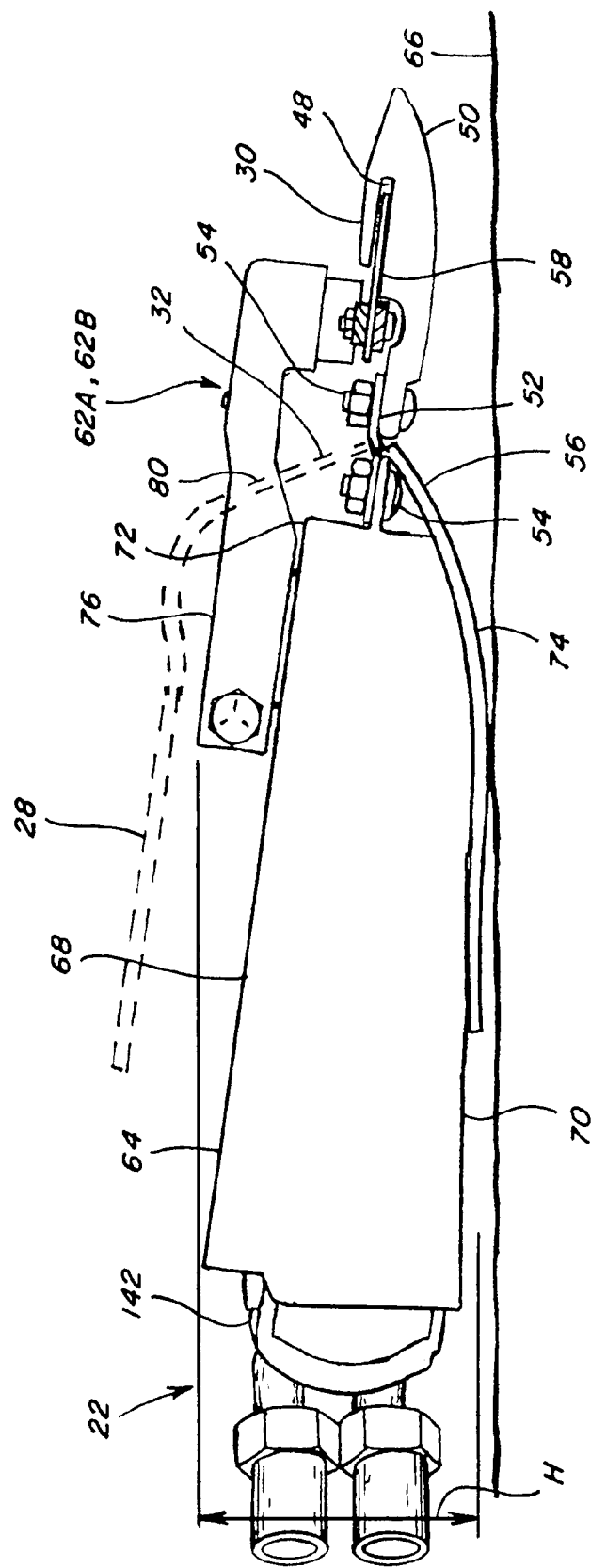
FIG. 5 is an enlarged side view showing aspects of the header, drives, and sickle.

Referring more particularly to FIGS. 4 and 5, cutter bar assemblies 44 and 46 each include a plurality of sidewardly facing aligned slots 48 through a sidewardly extending array of guards 50 which project forwardly from a stationary bar 52 at sidewardly spaced intervals therealong. Stationary bar 52 extends the length of sickle 30 just forwardly of forward edge portion 32 of floor 28, and guards 50 are mounted to bar 52 with fasteners 54. Bar 52, in turn, is mounted to a frame 56 of header 22 adjacent to forward edge portion 32 by fasteners 54, as best illustrated in FIG. 5. Each of cutter bar assemblies 44 and 46 supports an elongate knife assembly 58 for reciprocating longitudinal movement within slots 48, each knife assembly 58 including a row of knife sections including oppositely facing, angularly related knife edges 60 which, in conjunction with adjacent guards 50, effects a shearing or cutting action which severs plant stems and stalks or other material captured between the knives and the guards as the knife sections are reciprocatingly moved sidewardly, as denoted by arrow A in FIG. 4.

As noted above under the Background Art heading, it is desirable to reduce negative effects of the reciprocating sideward motion of knife assemblies 58, including, but not limited to, vibration, fatigue failure, and the like, and also the disadvantages of known structures for effecting the motion, including the need for substantial structure for supporting drive mechanisms on the sides of headers, the increased width of side dividers containing the mechanism, and apparatus for timing drive mechanisms located on opposite sides of a header.

Reduction of these negative effects and disadvantages is achieved according to the present invention by utilizing first and second cam driven low profile sickle drives 62A and 62B constructed and operable according to the teachings of the present invention, for reciprocatingly driving the respective knife assemblies 58. First and second sickle drives 62A and 62B are illustrated in FIG. 3 at a center location on header 22 between side edge portions 40 and 42, although it should be noted that it is contemplated that sickle drives 62A and 62B could alternatively be utilized at other locations on a header, and that multiple sickle drives 62 could be used at multiple locations on a header, as described and illustrated later herein.

First and second sickle drives 62A and 62B are packaged together in a low profile common enclosure 64. Enclosure 64 is configured so as to be integrated into or beneath floor 28 of header 22, in, or just rearward of, forward edge portion 32, as best shown in FIGS. 4, 5 and 5A, to facilitate both smooth flow of crop or plant material thereover, and also smooth passage over the ground surface 66 therebelow. In this latter capacity, it can be observed that enclosure 64 is desirably configured to have a tapered profile shape when viewed from the side, preferably including an upper cover 68, and a lower cover 70 to allow disassembly, and which extend generally convergingly toward a forward end 72 of the enclosure. Also preferably, the forward end of lower cover 70 will have an upwardly curving shape, to guide and facilitate the smooth passage over the ground surface and flow of plant material thereabout. It can be observed that forward edge portion 32 of floor 28 has an upwardly curved shape, which combined with the upwardly tapered or curved forward end of enclosure 64, provides header 22 with an overall wedge shaped leading edge profile, which again, facilitates the smooth flow over the ground and of plant material over the front edge of the header. Enclosure 64 can be mounted in any suitable manner, such as by attachment with fasteners to frame or structural elements of header 22.

As shown, upper cover 68 of enclosure 64 is located below forward edge portion 32 of floor 28, which can comprise sheet metal or other suitable material, such that cut plant material will flow over the enclosure without contacting it. Alternatively, upper cover 68 can be integrated into floor 28. Enclosure 64 will be of cast and/or machined metal construction such as steel or aluminum, and upper and lower covers 68 and 70 can be joined together with suitable fasteners, as illustrated in subsequent figures. A skid plate 74 can be disposed below at least the forward end, for protection from wear and contact with hard objects such as rocks and the like that may be encountered during operation.

Each of first and second sickle drives 62A and 62B includes a knife arm 76 atop upper surface 68 of enclosure 64 and extending forwardly therefrom. Knife arms 76 pivotally connect to the knife assemblies 58, respectively, and are movable by the respective drive 62A or 62B in a sideward pivoting action that will translate via a pivoting relationship into the above described sideward reciprocating movement, as restrained by the guards 50. Knife arms 76 are the only upwardly externally protruding elements of first and second drives 62A and 62B, the other elements being located within an internal cavity 78 of enclosure 64. Knife arms 76 project forwardly through slots 80 in forward edge portion 32, to minimize interruption of the plant material flow.

Referring also to FIGS. 6, 7, 8 and 9, the internal elements of first and second drives 62A and 62B other than knife arms 76 are disposed in side by side relation in an internal cavity 78 (FIGS. 6 and 7) of enclosure 64. First and second drives 62A and 62B are each configured as a cam driven arrangement, including a central rotatable input element, a cam element rotatable about the rotatable input element, and a pivoting pivot arm moved by the cam element to pivot the knife arm side to side. More particularly, first drive 62A includes a rotatable first input element 82 supported in an upper region of cavity 78 for rotation about a generally upstanding first rotational axis 84.

Drive 62A includes a first cam element 86 supported in cavity 78 below first input element 82 for rotation thereby about first rotational axis 84. Here, cam element 86 preferably comprises a downward projecting continuous track 88 mounted to or formed on a bottom surface 90 of input element 82. Track 88 has a radial outer cam surface 92 (relative to first rotational axis 84) and a radial inner cam surface 94, which are uniformly spaced apart but which vary in radial distance from first rotational axis 84, defining a profile shape of cam element 86 about axis 84. Here also, the profile shape is generally a "D" shape which is adapted for the purposes of the present sickle, but it should be understood that other shapes can be used, as desired or required for a particular application. For instance, shapes which optimize the speed, acceleration, mechanical advantage, etc. of the drive within the cutting stroke cycle (one cam revolution) to improve shearing of the crop may be utilized as desired or required for a particular application.

Drive 62A includes a first pivot arm 96 disposed in cavity 78, having a first end 98 and an opposite second end 100. First end 98 includes an cam follower 102 disposed and configured to cooperatively engage and follow the radial position of at least one of cam surfaces 92 and 94 relative to first rotational axis 84, as the cam surface or surfaces rotate about axis 84 with input element 82. Here, cam follower 102 effectively captures cam element 86 so as to be capable of following its contours and comprises a follower frame 104 pivotally mounted to pivot arm 96 by a pivot joint 106, for pivotal movement as denoted by arrow PM to allow following the curves and contours of the cam profile. Follower frame 104 carries a rotatable outer follower roller 108 and a rotatable inner follower roller 110, configured to engage and roll along respective cam surfaces 92 and 94 during rotation of cam element 86 about axis 84, as denoted by arrow R. First pivot arm 96 is oriented to extend forwardly from first end 98 to second end 100. Second end 100 includes an upwardly extending pivot shaft 112 which supports pivot arm 96 for pivotal rotation about a generally upstanding first pivotal axis 114 therethrough. Pivot shaft 100 extends upwardly through an aperture 116 through upper cover 68 of enclosure 64 and fixedly connects to a knife arm 76, e.g., via a splined connection or the like, such that knife arm 76 will pivot with pivot arm 96.

Figure 8:
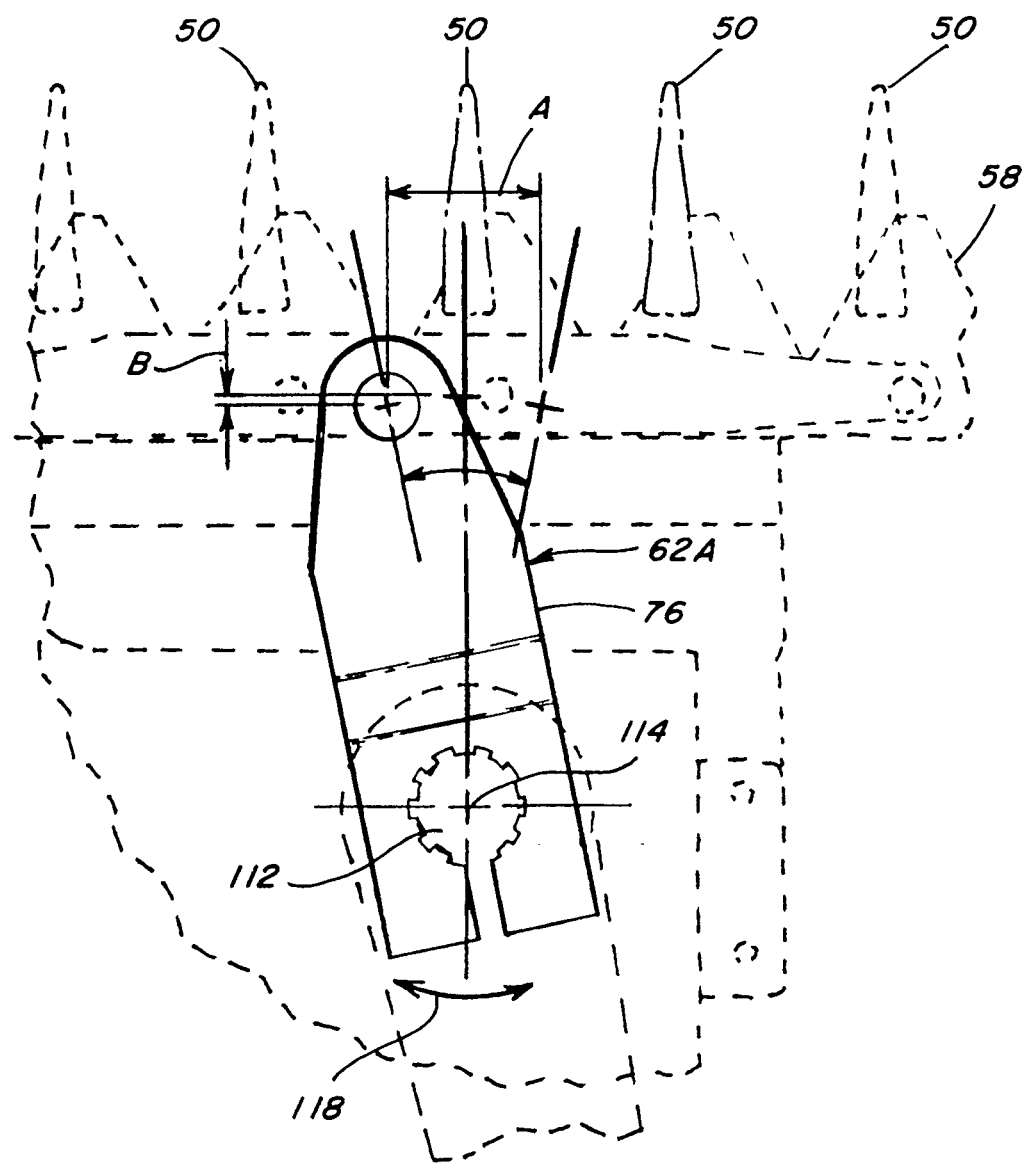
FIG. 8 is a simplified schematic partial top view of the header and one of the drives, illustrating operating positions thereof.
Figure 9:
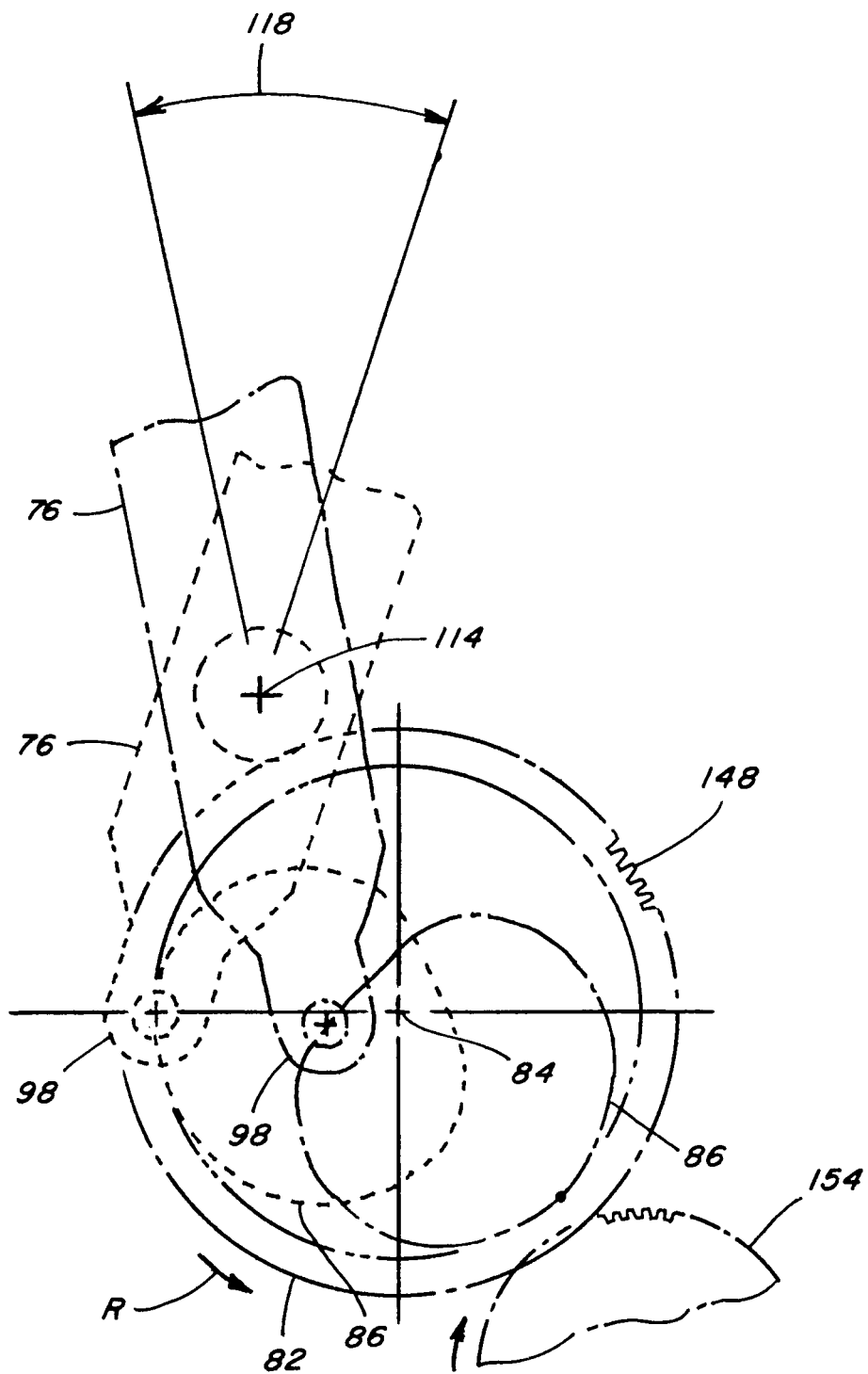
FIG. 9 is another simplified schematic partial bottom view illustrating different cam and operating positions of one of the drives.

In operation, rotation of first input element 82 will cause first cam element 86 to rotate about first rotational axis 84. First pivot arm 96, because it has a fixed length and has cam follower 102 on one end and the other end is restrained to rotate only about pivotal axis 114, can only pivot side to side about axis 114 in a limited manner, about an arcuate path 118. Because knife arm 76 is fixedly connected to the upper end of pivot shaft 112, it will be limited in movement to arcuate path 118 also, as shown in FIG. 8. Additionally, because the opposite end of knife arm 76 is connected to a knife assembly 58, knife assembly 58 will be reciprocatingly moved sidewardly an amount A (FIGS. 4 and 8) relative to guards 50, to effect the plant cutting action. In this regard, the connection of knife arm 76 to knife assembly 58 is preferably a pinned connection such that knife assembly 58, or that portion thereof in proximity to knife arm 76, will also move along the pivotal path, such that some limited fore and aft movement of the knife assembly will occur, as denoted by distance B in FIG. 8. The relationship between the guards and knife assembly can be configured to allow this. Alternatively, the connection between the knife head and knife assembly can be configured, e.g., slotted connection, to allow some limited fore and aft relative movement, such that the knife assembly only moves sidewardly.

Second drive 62B includes a rotatable second input element 120 supported in an upper region of cavity 78 for rotation about a generally upstanding second rotational axis 122. Drive 62B includes a second cam element 124 supported in cavity 78 below second input element 120 for rotation thereby about second rotational axis 122. Here, cam element 124 preferably comprises a downward projecting continuous track 126 mounted to or formed on a bottom surface 128 of input element 120. Track 126 has a radial outer cam surface 130 (relative to second rotational axis 122) and a radial inner cam surface 132, which are uniformly spaced apart but which vary in radial distance from second rotational axis 122, defining a profile shape of cam element 124 about axis 122. Again, the profile shape is generally a "D" shape which is adapted for the purposes of the present sickle. The profile shape is also the mirror image of the profile shape of first cam element 86.

Drive 62B includes a second pivot arm 134 having a first end 136 and an opposite second end 138. First end 136 includes an a cam follower 140 disposed and configured to cooperatively engage and follow the radial position of at least one of cam surfaces 130 and 132 about axis 122, as the cam surface or surfaces rotate thereabout with input element 120. Like follower 102, cam follower 140 comprises a follower frame 104 pivotally mounted to pivot arm 134 by a pivot joint 106, for pivotal movement as denoted by arrow PM to allow following the curves and contours of the cam profile. Follower frame 104 carries a rotatable outer follower roller 108 and a rotatable inner follower roller 110, configured to engage, capture and roll along respective cam surfaces 130 and 132 during rotation of cam element 124 about axis 122, as denoted by arrow R. Second pivot arm 134 is oriented to extend forwardly from first end 136 to second end 138. Second end 138 includes an upwardly extending pivot shaft 142 which supports pivot arm 134 for pivotal rotation about a generally upstanding second pivotal axis 144 therethrough. Pivot shaft 142 extends upwardly through an aperture 146 through upper cover 68 of enclosure 64 and fixedly connects to a second knife arm 76, e.g., via a splined connection or the like, such that knife arm 76 will pivot with pivot arm 134.

In operation, rotation of second input element 120 will cause second cam element 124 to rotate about second rotational axis 122. Second pivot arm 134, because it has a fixed length and has cam follower 140 on one end that essentially captures cam element 124 and the other end, is restrained to rotate only about pivotal axis 144, can only pivot side to side about axis 144 in a limited manner, about an arcuate path 148. Because knife arm 76 is fixedly connected to the upper end of pivot shaft 142, it will be limited in movement to an arcuate path also. Additionally, because the opposite end of knife arm 76 is connected to a knife assembly 58, knife assembly 58 will be reciprocatingly moved sidewardly an amount A (FIGS. 4 and 8) relative to guards 50, to effect the plant cutting action in the same manner as for drive 62A.

Figure 6:
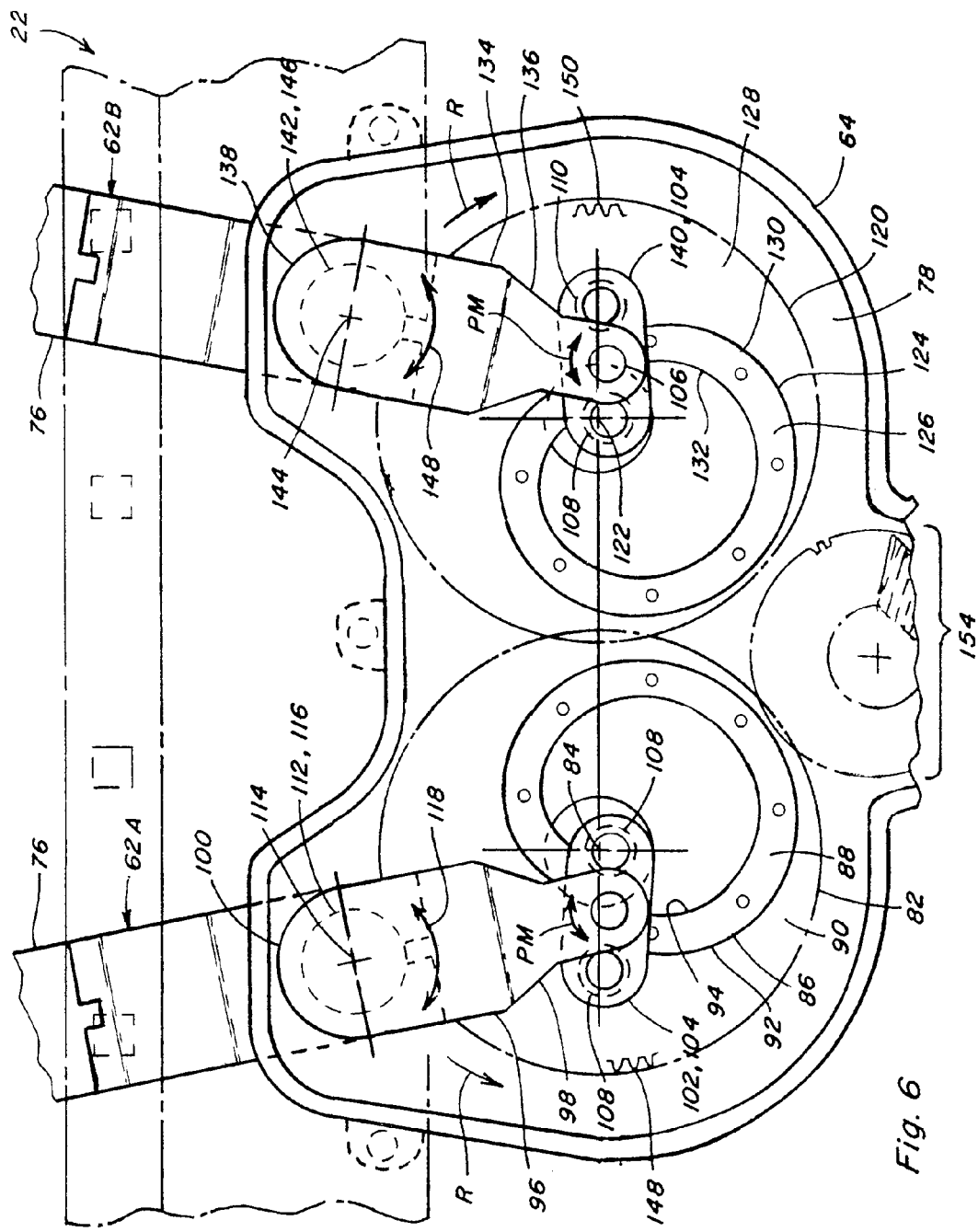
FIG. 6 is a simplified schematic bottom view of the drives, illustrating internal elements thereof.
Figure 7:
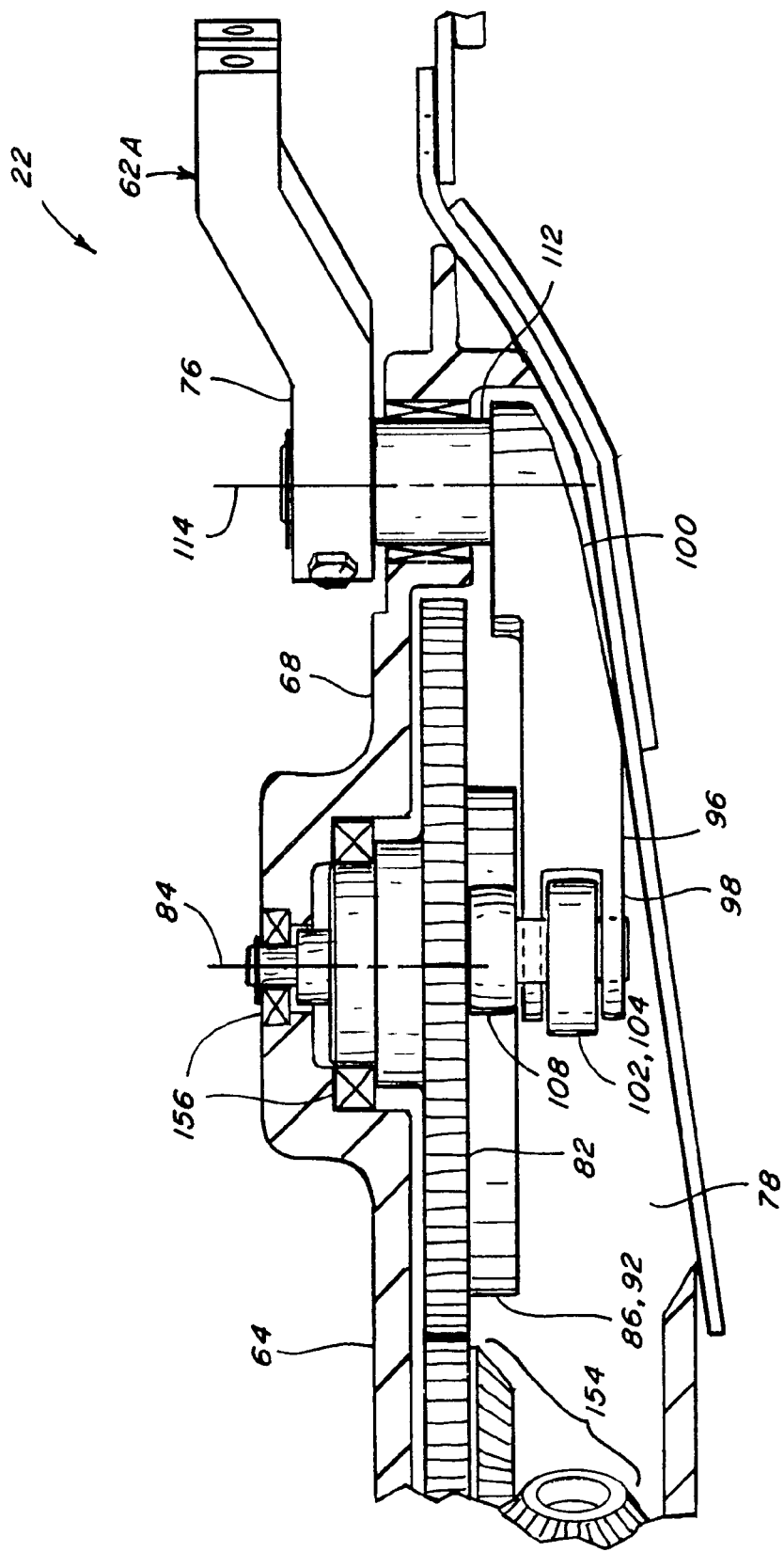
FIG. 7 is a simplified schematic side view of one of the drives.

It is desired to reciprocatingly move the two knife assemblies 58 simultaneously in opposite sideward directions. To achieve this, first and second drives 62A and 62B are preferably operated in opposite direction, in timed relation. This is preferably accomplished by jointly driving the drives in opposite rotational directions. In the preferred configuration shown, first and second input elements 82 and 120 are connected together via enmeshed gears 148 and 150 which extend therearound, respectively, as shown in FIG. 6. Alternatively, input elements 82 and 120 could be connected together by a cogged belt, a timing shaft, or the like.

To rotate input elements 82 and 120, a rotatable power source 152 is provided, which is preferably an electric or fluid motor, connected in driving relation to one of the input elements 82 or 120 via a bevel gear arrangement 154 or the like, having a gear that engages gear 148 or 150. Alternatively, the power source could comprise a shaft, chain or belt drive, as desired. Here, power source 152 is mounted to housing 64 at an acute angle to the forward direction, as best shown in FIG. 5A. This enables accommodating power source 152 in a manner to provide a shorter overall fore and aft extent of the drives. However, it should be noted that the drives of the invention can be powered from any desired direction or power source or device.

As a feature of the invention, to provide a relatively thin, flat overall package, input elements 82 and 120, cam elements 86 and 124, and pivot arms 96 and 124 of drives 62A and 62B are each relatively flat, to provide vertical compactness, such that drives 62A and 62B are adapted to be unobtrusively positioned below or in the front region of floor 28 of a header, such as header 22, to allow relatively unhindered plant material flow thereover. In this regard, input elements 82 and 120 are each preferably disk or platter shaped elements supported for rotation about axes 84 and 122, respectively by suitable bearings 146. This configuration provides input elements 82 and 120 mass to serve as flywheels for the drives. Also, input elements 82 and 120 overlap portions of pivot arms 96 and 134, respectively, to facilitate fore and aft compactness.

As an advantage, because the two drives are oppositely moving, external forces and resulting vibrations generated by the drives in both the sideward and fore and aft directions, are largely canceled. As another advantage, the configuration of drives 62A and 62B, and packaging in a single enclosure 64, allows pivot shafts 112 and 142 to be of relatively large diameter, so as to be robust and strong.

As yet another advantage, it can be observed that the sickle drive, including the enclosure and rotatable power source, can have an overall vertical extent or height, denoted by height H in FIG. 5 that facilitates placement in or below the floor of a header of a plant cutting machine, such that only the knife arms protrude upwardly from the floor.

Referring also to FIG. 10, additional embodiments of a cam driven low profile sickle drive, 62C and 62D are shown connected in pivoting driving relation to knife arms 76 for pivotally driving knife assemblies 58 (FIGS. 4 and 8) in the above described manner, like parts of drive 62C and 62D, and 62A and 62B being described by like numbers. More particularly, first drive 62C includes a rotatable first input element 82 supported in an upper region of cavity 78 for rotation about a generally upstanding first rotational axis 84. Drive 62C includes a first cam element 86 supported in cavity 78 below first input element 82 for rotation thereby about first rotational axis 84. Here, cam element 86 preferably comprises a downward projecting continuous track 88 mounted to or formed on a bottom surface 90 of input element 82. Track 88 has a radial outwardly facing cam surface 92 (relative to first rotational axis 84) which varies in radial distance from first rotational axis 84, defining a profile shape of cam element 86 about axis 84. The profile shape is generally an elliptical shape adapted for the purposes of the present sickle, but it should be understood that other shapes can be used, such as, but not limited to, an oval shape, as desired or required for a particular application. Cam element 86 and cam surface 92 are illustrated in solid lines in a fore and aft extending orientation, and in phantom, denoted 86' and 92', in a side to side orientation, rotated 90 degrees from the fore and aft position.

Drive 62C includes a first pivot arm 96 disposed in a fore and aft extending orientation in cavity 78, having a first end 98 and an opposite second end 100. First end 98 includes a cam follower 158 disposed and configured to contact and follow the radial position of cam surface 92 as it varies radially relative to first rotational axis 84 during rotation of cam element 86 with input element 82. Second end 100 includes an upwardly extending pivot shaft 112 which supports pivot arm 96 for pivotal rotation about a generally upstanding first pivotal axis 114 therethrough. Pivot shaft 100 extends upwardly through an aperture through enclosure 64 and fixedly connects to a knife arm 76, e.g., via a splined connection or the like, such that knife arm 76 will pivot with pivot arm 96.

Second drive 62D includes a rotatable second input element 120 supported in an upper region of cavity 78 beside input element 82 for rotation about a generally upstanding second rotational axis 122. Drive 62D includes a second cam element 124 supported in cavity 78 below second input element 120 for rotation thereby about second rotational axis 122. Like cam element 86, cam element 124 preferably comprises a downward projecting continuous track 126 mounted to or formed on a bottom surface 128 of input element 120. Track 126 has a radial outwardly facing cam surface 130 which varies in radial distance from second rotational axis 122, defining a profile shape of cam element 124 about axis 122. Again, the profile shape is generally an elliptical shape adapted for the purposes of the present sickle, but it should be understood that other shapes can be used, such as, but not limited to, an oval shape, as desired or required for a particular application. Cam element 124 and cam surface 130 are illustrated in solid lines in a fore and aft extending orientation, and in phantom, denoted 124' and 130', in a side to side orientation, rotated 90 degrees from the fore and aft position. Drive 62D includes a second pivot arm 134 disposed in a fore and aft extending orientation in cavity 78, having a first end 136 and an opposite second end 138. First end 136 includes a cam follower 158 disposed and configured to contact and follow the radial position of cam surface 130 as it varies radially relative to second rotational axis 122 during rotation of cam element 124 with input element 120. Second end 138 includes an upwardly extending pivot shaft 142 which supports pivot arm 134 for pivotal rotation about a generally upstanding second pivotal axis 144 therethrough. Pivot shaft 142 extends upwardly through an aperture through enclosure 64 and fixedly connects to a knife arm 76, e.g., via a splined connection or the like, such that knife arm 76 will pivot with pivot arm 134 to effect a plant cutting action as explained above.

The sideward outer ends of cam elements 86 and 124 are encircled by a continuous chain 160. Chain 160 does not rotate about the cam elements and instead remains stationary. Chain 160 is flexible, which enables it to follow and conform to the shapes of the outer ends of elements 86 and 124, as those elements are rotated about axes 84 and 122, respectively, by the input elements and thus effectively change shape. More importantly, the radius or distance from the rotational axis to the cam surface 92 and 130 at the outer side ends changes, and thus, the distance to chain 160 changes, during the rotation of the input elements. Spring biased tensioner mechanisms 162 are configured and disposed between cam elements 86 and 124 to maintain tension in chain 160 and remove slack therefrom sufficiently for conforming to and following cam surfaces 92 and 130. Tracks 88 and 126 extend about surfaces 92 and 130 to maintain chain 160 aligned therewith. Each of the cam followers 158 comprises a pin that extend through and connect two adjacent links of chain 160 at the sidemost extent thereof, such that first ends 98 and 136 of the pivot arms are maintained in contact with the chain, and thus follow the radial movements of cam surfaces 92 and 130, without rotating about the rotational axes therewith. The present invention utilizes apparatus to maintain followers 158 in contact with cam surfaces 92 and 130 along the outer ends. Representative apparatus for this purpose shown here includes spring biased tensioner mechanisms 162 configured and disposed between cam elements 86 and 124 to maintain tension in chain 160 and remove slack therefrom sufficiently for conforming to and following cam surfaces 92 and 130. Alternatively, the ends of the pivot arms could be biased toward the cam surfaces, for example, using springs or the like, either between the enclosure or another fixed element and the respective pivot arms, or between the pivot arms, or an outer retaining track could be used, as non-limiting examples.

In operation, input elements 82 and 120 of drives 62C and 62D are simultaneously rotated to rotate cam elements 86 and 124 in timed relation. Here, this is achieved by connecting the input elements 82 and 120 with enmeshed gears 148 and 150 as explained above. A rotatable power source, 152, is connected in rotatably driving relation to one of the input elements with a bevel gear arrangement 154. The bevel gear can be on an idler shaft as illustrated, or incorporated onto a gear 148 or 150. This rotation will cause rotation of cam elements 86 and 124, to effect the inward and outward sideward movements of chain 160, which, in turn, will pivot pivot arms 96 and 134 similarly to the manner described above in reference to drives 62A and 62B, to effect the cutting action of the sickle knives 58 (FIGS. 4 and 8).

As possible variations, it should be noted that it all or part of the drive can be incorporated in or below a floor of a header, to provide the desired low profile and flow of cut crop material thereabout. It should also be understood that the vertical arrangement of the drive can be reversed, such that the input element can be on the bottom and the cam follower and pivot arm elements can be above the input element, if desired. Further, a variety of different cam and follower arrangements can be used, and the inner and outer cam surfaces and followers are not required to be uniformly spaced apart, nor is the follower required to be pivoting for all possible cams, and the followers can be connected directly to the pivot arm when used with some cams. As a representative example, an internal cam wherein the follower travels in a groove between cam surfaces can be used. As another example, a spring biased follower could be used.

It should also be noted that the cam mechanism can operated at a different speed, and/or the cam can be larger or smaller, such that one revolution of the cam causes more or less than one reciprocating cutting stroke of the sickle knife. For instance, rotation of the cam at one-half cycle speed, or use of a larger cam, could be used to obtain two cutting strokes per cam revolution, or movement at one-third speed or a correspondingly larger cam used to obtain three cutting strokes per revolution.

As still further variations, it should be noted that the pivot arms of the invention can be incorporated into unitary members with the knife arms; and the pivot arms can be configured to pivot about fixed pivot shafts as opposed to incorporating and rotating with the shafts, as desired or required. Still further, it should be understood that each drive can be configured and operable for connection in driving relation to more than one sickle section, if desired or required for a particular application.

In light of all the foregoing, it should thus be apparent to those skilled in the art that there has been shown and described a cam driven low profile sickle drive. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A sickle drive for a plant cutting machine having a first sickle knife assembly supported for side to side reciprocating movement along a forward end of the machine, and a rotary power source for driving the first sickle knife assembly, the sickle drive comprising:
   a rotatable first input element for being driven by the rotary power source and supported in a cavity for rotation about a generally upstanding first rotational axis,
   a first cam element supported in the cavity in connection with the first input element for rotation thereby, the first cam element including a cam surface extending about the first rotational axis which varies in radial distance therefrom,
   a first pivot arm having a first end and an opposite upwardly extending second end and configured for connection to the first sickle knife assembly, and
   a first pivot shaft supporting the first pivot arm for sideward pivotal movement about an upstanding first pivotal axis, the first end of the first pivot arm including a cam follower configured and positioned in following relation to the first cam element such that rotation of the first cam element about the first rotational axis will move the first end radially relative to the first rotational axis to reciprocatingly pivot the first pivot arm sidewardly, and wherein the first cam element is positioned between opposing ends of the cam follower.

2. The sickle drive of claim 1, further comprising:
   a rotatable second input element supported in the cavity for rotation about a generally upstanding second rotational axis,
   a second cam element supported in the cavity in connection with the second input element for rotation thereby, the second cam element including a cam surface extending about the second rotational axis which varies in radial distance therefrom,
   a second pivot arm having a first end and an opposite upwardly extending second end and configured for connection to a second knife assembly of the plant cutting machine, and
   a second pivot shaft supporting the second pivot arm for sideward pivotal movement about an upstanding second pivotal axis, the first end of the second pivot arm including a cam follower configured and positioned in following relation to the second cam element such that rotation of the second cam element about the second rotational axis will move the first end of the second pivot arm radially relative to the second rotational axis to reciprocatingly pivot the second pivot arm sidewardly.

3. The sickle drive of claim 2, wherein the first and second input elements are connected so as to be rotated in opposite directions by the rotary power source.

4. The sickle drive of claim 1, wherein the second end of the first pivot arm comprises the first pivot shaft.

5. The sickle drive of claim 4, wherein the first input element is disk shaped and the first end of the pivot arm is disposed below a forward portion thereof and extends forwardly to the pivot shaft.

6. The sickle drive of claim 5, wherein the power source comprises a motor.

7. The sickle drive of claim 6, wherein the motor is a fluid motor or an electric motor.

8. The sickle drive of claim 1, wherein the first cam element is below the rotatable first input element.

9. The sickle drive of claim 1, wherein the first cam element extends proud from the rotatable first input element.

10. The sickle drive of claim 1, wherein the cam follower is pivotably connected to the first pivot arm and includes:
   an elongated body, a first roller about a first end of the elongated body, and
a second roller about a second end of the elongated body opposite the first end.

11. The sickle drive of claim 10, wherein each of the first and second rollers engages the first cam element.

12. A sickle drive comprising;
a cavity having a forward end disposed just rearwardly of a sidewardly extending sickle of a header of an agricultural plant cutting machine; and
a cam drive mechanism including:
a rotatable first input element supported at least partially in the cavity for rotation about a generally upstanding first rotational axis,
a first cam element extending proud of the first input element for rotation thereby in about the first rotational axis, the first cam element having a generally horizontal cam profile laterally offset relative to the first rotational axis,
a first pivot arm having a first end including a cam follower disposed in following relation to the first cam element, the first pivot arm extending to a second end,
a first pivot shaft supporting the first pivot arm for rotation about a generally upstanding first pivotal axis, such that the first pivot arm will pivot about the first pivotal axis by following the cam profile of the first cam element, and
a first knife arm connected to the first pivot shaft and connecting to a first knife assembly of the sickle, such that the first knife assembly will be reciprocated by the rotation of the first pivot shaft.

13. The sickle drive of claim 12, further comprising a second cam drive mechanism including:
a rotatable second input element supported at least partially in the cavity for rotation about a generally upstanding second rotational axis,
a second cam element in connection with the second input element for rotation thereby about the second rotational axis, the second cam element having a generally horizontal cam profile laterally offset relative to the second rotational axis,
a second pivot arm having a first end including a cam follower disposed in following relation to the second cam element, the second pivot arm extending forwardly to a second end,
a second pivot shaft supporting the second pivot arm for rotation about a generally upstanding second pivotal axis, such that the second pivot arm will pivot sidewardly about the second pivotal axis by following the cam profile of the second cam element, and
a second knife arm connected to the second pivot shaft and connecting to a second knife assembly of the sickle, such that the second knife assembly will be reciprocated sidewardly relative to the enclosure or floor by the rotation of the second pivot shaft.

14. The sickle drive of claim 13, wherein the first input element and the second input element are connected together for joint rotation in opposite rotational directions for reciprocatingly moving the first and second sickle knife assemblies sidewardly simultaneously in opposite directions, such that sideward forces generated by the movements of the knife assemblies will substantially cancel each other.

15. The sickle drive of claim 14, further comprising a rotatable power source connected in rotatably driving relation to one of the first input element and the second input element, and substantially vertically coextensive with the sickle drive.

16. The sickle drive of claim 15, wherein the power source comprises a fluid motor or an electric motor.

17. The sickle drive of claim 16, wherein the first cam profile and the second cam profile have shapes that are substantially mirror images of each other.

18. A header for a plant cutting machine comprising:
a first sickle knife assembly supported for side to side reciprocating movement along a forward end of the machine;
a rotary power source for driving the first sickle knife assembly; and
a sickle drive that includes:
a rotatable first input element driven by the rotary power source and supported in a cavity below a floor of the header for rotation about a generally upstanding first rotational axis,
a first cam element extending outwardly from an outer surface of the first input element for rotation thereby, the first cam element including a cam surface extending about the first rotational axis which varies in radial distance therefrom,
a first pivot arm having a first end and an opposite extending second end configured for connection to the first sickle knife assembly,
a first pivot shaft supporting the first pivot arm for pivotal movement about an upstanding first pivotal axis, and
a cam follower pivotably connected to the first end of the first pivot arm for engaging the first cam element such that rotation of the first cam element about the first rotational axis will move the first end radially relative to the first rotational axis to reciprocatingly pivot the first pivot arm sidewardly.

19. The header of claim 18, wherein the first cam element is positioned between opposing ends of the cam follower.

20. The header of claim 18, wherein the sickle drive is disposed completely below the floor of the header and between opposite side ends of the header.

21. The header of claim 18, wherein the floor is part of an enclosure that defines the cavity and the enclosure has an overall vertical extent, and wherein the rotary power source is disposed adjacent to a rear end of the enclosure and has a vertical extent less than the overall vertical extent of the enclosure so as to follow unobtrusively in a path of the enclosure when the sickle drive is moved forwardly within the enclosure.

* * * * *